(12) United States Patent
Damneun et al.

(10) Patent No.: US 11,274,481 B2
(45) Date of Patent: Mar. 15, 2022

(54) TRACK BASE DOOR HINGE MECHANISM

(71) Applicant: The Boeing Company, Chicago, IL (US)

(72) Inventors: Char Damneun, Renton, WA (US); Dileep Aruna Vasanthakumar, Bangalore (IN); Avinash P. Peter, Bangalore (IN)

(73) Assignee: THE BOEING COMPANY, Chicago, IL (US)

( * ) Notice: Subject to any disclaimer, the term of this patent is extended or adjusted under 35 U.S.C. 154(b) by 578 days.

(21) Appl. No.: 16/161,422

(22) Filed: Oct. 16, 2018

(65) Prior Publication Data

US 2020/0115942 A1 Apr. 16, 2020

(51) Int. Cl.
  *B64D 11/00* (2006.01)
  *E05D 15/16* (2006.01)
  *E05D 15/22* (2006.01)

(52) U.S. Cl.
  CPC .......... *E05D 15/165* (2013.01); *B64D 11/003* (2013.01); *E05D 15/22* (2013.01); *E05D 2015/225* (2013.01); *E05Y 2201/69* (2013.01); *E05Y 2600/45* (2013.01); *E05Y 2600/53* (2013.01); *E05Y 2800/102* (2013.01); *E05Y 2800/266* (2013.01); *E05Y 2900/502* (2013.01)

(58) Field of Classification Search
  CPC ....... E05D 15/165; E05D 15/20; E05D 15/22; E05D 2015/225; E05D 2015/246; E05D 15/38; E05D 15/36; B64D 11/003; E05Y 2201/69; E05Y 2600/45; E05Y 2600/53; E05Y 2800/102; E05Y 2800/266; E05Y 2900/502; E05Y 2900/538; E05Y 2900/54; E06B 3/50

USPC ............................ 49/40, 41, 197, 201, 214
See application file for complete search history.

(56) References Cited

U.S. PATENT DOCUMENTS

| | | | | |
|---|---|---|---|---|
| 1,115,345 A | * | 10/1914 | Steuernagel | E05D 15/38 312/109 |
| 2,590,028 A | * | 3/1952 | Miller | E05D 15/38 312/323 |
| 4,383,392 A | * | 5/1983 | La Conte | B64D 11/003 49/205 |

(Continued)

FOREIGN PATENT DOCUMENTS

DE       202014100154 U1 * 4/2015 ............. E05D 15/20

*Primary Examiner* — Johnnie A. Shablack
*Assistant Examiner* — Jeremy C Ramsey
(74) *Attorney, Agent, or Firm* — Parsons Behle & Latimer

(57) ABSTRACT

A door mechanism for a compartment on an aircraft that includes a door with a first lower guide, a second lower guide, a first upper guide, and a second upper guide. The door mechanism includes a first lower track, a second lower track, a first upper track, and a second upper track, each having a guide track. The first lower guide, second guide, first upper guide, and second upper guide being configured to travel along the corresponding guide track to enable the door to move between open and closed positions. The door in the open position may be positioned within a portion the compartment or may be positioned above the compartment. The first and second lower tracks may include a first a second gap that enables the door to be selectively uncoupled from the first and second lower track guides permitting the door to swing away from the compartment.

20 Claims, 5 Drawing Sheets

(56) References Cited

U.S. PATENT DOCUMENTS

| | | | | |
|---|---|---|---|---|
| 5,096,253 | A * | 3/1992 | Jo | B60J 1/04 |
| | | | | 296/190.1 |
| 5,337,520 | A * | 8/1994 | Uribe | E05D 13/003 |
| | | | | 49/197 |
| 5,520,358 | A * | 5/1996 | Kahn | B64C 1/14 |
| | | | | 244/1 R |
| 6,227,635 | B1 * | 5/2001 | Teppo | E05D 15/403 |
| | | | | 312/245 |
| 6,886,781 | B2 | 5/2005 | Lau et al. | |
| 8,702,037 | B2 | 4/2014 | Schmitz et al. | |
| 8,929,525 | B1 * | 1/2015 | Edwards | H04N 7/147 |
| | | | | 379/114.21 |

* cited by examiner

TRACK BASE DOOR HINGE MECHANISM

FIELD OF THE DISCLOSURE

The examples described herein relate to a track base door hinge mechanism apparatus, track base door hinge mechanism systems for stowbins in an aircraft, and methods of providing track base door hinge mechanism for stowbins of an aircraft.

BACKGROUND

Description of the Related Art

Commercial aircraft typically include a plurality of stowbins for the storage various items including carry-on luggage during a flight. A door is pivotably attached to the stowbin that may be opened to access the interior volume of the stowbin. The door may be selectively secured in a closed position to prevent access to the interior volume of the stowbin as well as preventing any contents within the interior volume from falling out of the stowbin during a flight. Often, as the door of a stowbin is opened, the door pivotably moves away from the stowbin extending into the passenger compartment of an aircraft. The door extending into the passenger compartment may limit movement by passengers in the passenger compartment or at the very least present an obstacle that may need to be avoided. Additionally, the door may only be supported at two hinge points when the door is in the opened position. While the two hinge points may adequately support the stowbin door, the two hinges may be overdesigned to carry the load. A stowbin door support by two hinge points in an open position requires a counterbalance and friction to permit the stowbin door to remain in the open position.

FIG. 8 shows a prior door mechanism 500 having a door 510 connected to a storage compartment 550. The door 510 has an upper edge 511, lower edge 512, left edge 513, and right edge 514. Two hinges 580A, 580B along the upper edge 511 of the door 510 enable the door 510 to swing up and outward to permit access to the interior of the storage compartment 550. A latch 540 selectively secures the door 510 in a closed position. The door 510 only includes two supports as it moves from the closed position to the opened position. The outward movement of the door could disadvantageously strike a passenger and/or prohibit movement within the passenger compartment of an aircraft.

Other disadvantages of current flap deployment systems may exist.

SUMMARY

The present disclosure is directed to a track base door hinge mechanism for a storage bin of an aircraft. The track base door hinge mechanism is configured so that the door does not extend into the passenger compartment of the aircraft when opened, but rather is positioned within or above the storage bin.

One example of the present disclosure is a door mechanism for a compartment on an aircraft comprising a door having a bottom edge, a top edge opposite the bottom edge, a left edge, and a right edge opposite the left edge. The door having a first lower guide on the left edge, a second lower guide on the right edge, a first upper guide on the left edge, and a second upper guide on the right edge. The door mechanism for the compartment comprises a first lower track having a first lower guide track, wherein the first lower guide is configured to travel along the first lower guide track. The door mechanism for the compartment comprises a second lower track having a second lower guide track, wherein the second lower guide is configured to travel along the second lower guide track. The door mechanism for the compartment comprises a first upper track having a first upper guide track, wherein the first upper guide is configured to travel along the first upper guide track. The door mechanism for the compartment comprises a second upper track having a second upper guide track, wherein the second upper guide is configured to travel along the second upper guide track.

The door may have an open position that enables access to an interior of the compartment on the aircraft and a closed position that prevents access to the interior of the compartment on the aircraft, wherein the door is positioned within a portion of the interior of the compartment when in the opened position. The door may have an open position that enables access to an interior of the compartment on the aircraft and a closed position that prevents access to the interior of the compartment on the aircraft, wherein the door is positioned outside of the compartment when in the opened position. The door mechanism may include a latch along the bottom edge of the door, wherein the latch is configured to selectively secure the door to the closed position.

The first upper guide track and the second upper guide track may each be substantially straight lines along the first upper track and the second upper track, respectively, and wherein the first lower guide track and the second lower guide track may each be curved along the first lower track and the second lower track, respectively. The first and second upper guide tracks may be substantially parallel to a bottom portion of the compartment. Each of the first and second lower guide tracks may each include at least one stop positioned along the first and second lower guide tracks. The door may be in a partially opened position when the first and second lower guides are positioned, respectively, within the at least one stop positioned along the first and second lower guide tracks. The first upper guide track and the second upper guide track may each be curved along the first upper track and the second upper track, respectively, and wherein the first lower guide track and the second lower guide track may each be curved along the first lower track and the second lower track, respectively.

The first and second upper guide tracks may each include an inflection point, wherein a portion of the first and second upper guide tracks forward of the inflection point may have a curved upward slope and wherein a portion of the first and second upper guide tracks behind the inflection point may have a curved downward slope. The first lower track may have a first gap that opens to the first lower guide track and the second lower track may have a second gap that opens to the second lower guide track, wherein the first lower guide and the second lower guide are configured to move out of the first lower guide track and the second lower guide track, respectively, through the first and second gaps. The door may be configured to pivot about the first and second upper guides to enable the front edge of the door to move away from the compartment. The door mechanism may include a first latch configured to selectively prevent movement of the first lower guide through the first gap.

One example of the present disclosure is a door mechanism and stowbin system for an aircraft comprising a stowbin on an aircraft, the stowbin having an interior volume, and a curved door positioned adjacent to the stowbin. The door being movable between a closed position that prevents access to the interior volume of the stowbin and an open position that permits access to the interior volume of the stowbin. The system includes a first lower track having a first lower guide track, a second lower track having a second lower guide track, a first upper track having a first upper guide track, and a second upper track having a second upper guide track. The door travels along the first lower guide track, the second lower guide track, the first upper guide track, and the second upper guide track as the door moves between the open position and the closed position.

The first lower track, the second lower track, the first upper track, and the second upper track may each be positioned within the interior volume of the stowbin. The door may move exterior of the stowbin as the door moves from the closed position to the open position. The first and second lower track may be configured to enable a portion of the door to move away from the stowbin and wherein the first and second upper tracks may be configured to enable a portion of the door to pivot about the first and second upper tracks.

One example of the present disclosure is a method of providing a door mechanism for a stowbin of an aircraft. The method comprises coupling a door to a first lower track guide of a first lower track and coupling the door to a second lower track guide of a second lower track. The method includes coupling the door to a first upper track guide of a first upper track and coupling the door to a second upper track guide of a second upper track. The door is configured to move along the first lower track guide, the second lower track guide, the first upper track guide, and the second upper track guide while moving between a closed position that prevents access to an interior of the stowbin and an open position that permits access to the interior of the stowbin. The method may include providing a cap in each of the first and second lower track guides, wherein the gaps permit the door to be selectively uncoupled from the first and second lower track guides, respectively. The method may include providing a latch on the first lower track guide, the latch being configured to selectively prevent the door from being uncoupled from the first lower track guide.

Figure 1:
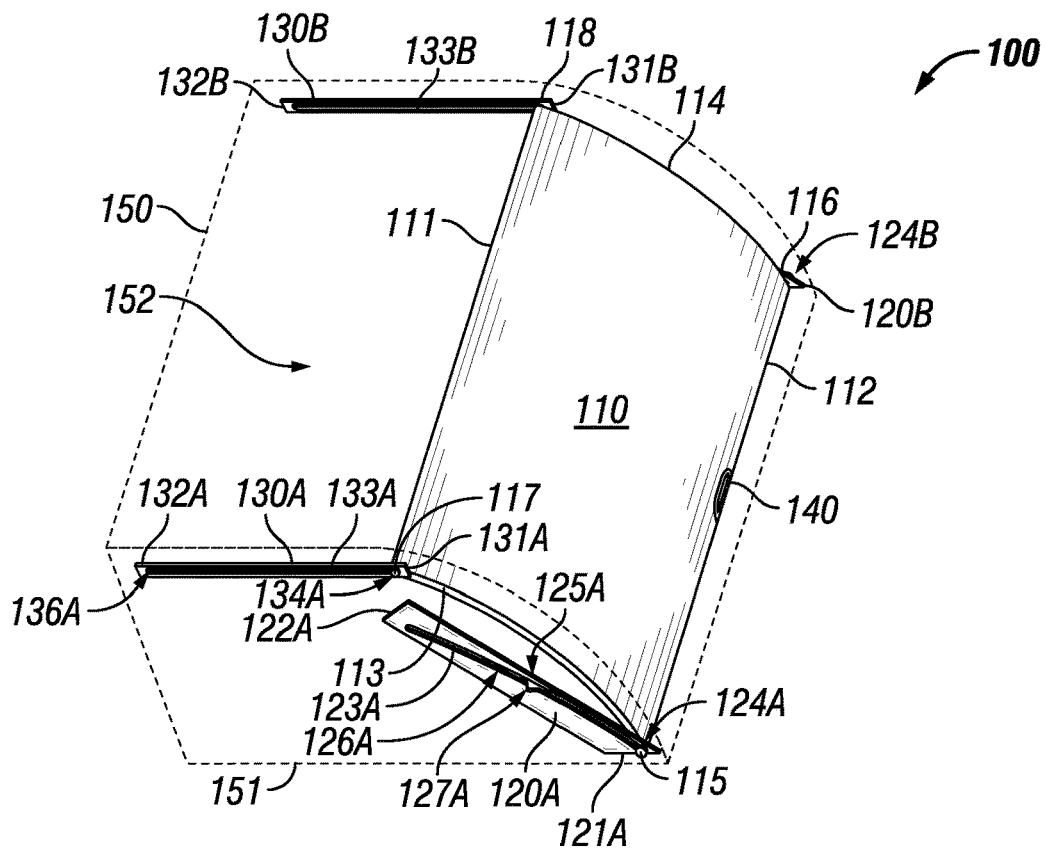
FIG. 1 is a schematic of one example of a track base door hinge mechanism with the door in a closed position.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows a schematic of one example of a door mechanism 100 for a compartment 150 on an aircraft, such as a stowbin in a passenger compartment of the aircraft. The compartment 150 is shown in dash for clarity purposes. The door mechanism 100 includes a door 110 that has an upper edge 111, a lower edge 112 opposite the upper edge 111, a left edge 113, and a right edge 114 opposite the left edge 113. The door 110 includes a first lower guide 115 on the left edge 113 and a second lower guide 116 on the right edge 114. The door 110 includes a first upper guide 117 on the left edge 113 and a second upper guide 118 on the right edge 114. The door 110 may include a latch 140 used to selectively secure the door 110 in the closed position, which is shown in FIG. 1, as would be appreciated by one of ordinary skill in the art.

The door mechanism 100 includes a first lower track 120A, a second lower track 120B, a first upper track 130A, and a second upper track 130B. In one example, the first lower track 120A, a second lower track 120B, a first upper track 130A, and a second upper track 130B are mounted within an interior 152 of the compartment 150. The second lower track 120B may be identical to the first lower track 120A. Likewise, the second upper track 130B may be identical to the first upper track 130A. The first lower track 120A includes a first end 121A, a second end 122A, and a first lower guide track 123A that extends substantially from the first end 121A to the second end 122A of the first lower track 120A. The first lower guide track 123A is configured to permit the first lower guide 115 of the door 110 to travel along the first lower guide track 123A as the door 110 moves between open and closed positions. The first lower guide track 123A includes a first position 124A along the first lower guide track 123A. When the door 110 is closed, the first lower guide 115 of the door 110 is positioned in the first position 124A along the first lower guide track 123A.

The second lower track 120B includes a first end 121B, a second end 122B, and a second lower guide track 123B that extends substantially from the first end 121B to the second end 122B of the second lower track 120B. The second lower guide track 123B is configured to permit the second lower guide 116 of the door 110 to travel along the second lower guide track 123B as the door 110 moves between open and closed positions. The second lower guide track 123B includes a first position 124B along the second lower guide track 123B. When the door 110 is closed, the second lower guide 116 of the door 110 is positioned in the first position 124B along the second lower guide track 123B.

The first upper track 130A includes a first end 131A, a second end 132A, and a first upper guide track 133A that extends substantially from the first end 131A to the second end 132A of the first upper track 130A. The first upper guide track 133A is configured to permit the first upper guide 117 of the door 110 to travel along the first upper guide track 133A as the door 110 moves between open and closed positions. The first upper guide track 133A includes a first position 134A along the first upper guide track 133A. When the door 110 is closed, the first upper guide 117 of the door 110 is positioned in the first position 134A along the first upper guide track 133A.

The second upper track 130B includes a first end 131B, a second end 132B, and a second upper guide track 133B that extends substantially from the first end 131B to the second end 132B of the second upper track 130B. The second upper guide track 133B is configured to permit the second upper guide 118 of the door 110 to travel along the second upper guide track 133B as the door 110 moves between open and closed positions. The second upper guide track 133B includes a first position along the first upper guide track 133A that corresponds to the first position 134A of the first upper track guide 133A. When the door 110 is closed, the first upper guide 117 of the door 110 is positioned in the first position 134A along the first upper guide track 133A.

The guide tracks 123A, 123B, 133A, 133B of the upper and lower tracks 120A, 120B, 130A, 130B are configured to engage the guides 115, 116, 117, 118 of the door 110 as the door 110 moves between the closed and opened positions. The guides 115, 116, 117, 118 and corresponding guide tracks 123A, 123B, 133A, 133B enable the door 110 to have at least four points of support at all times. The load of the door 110 is distributed over the four points of support. The door 110 does not require a counterbalance or friction to remain in the open position in contrast to a door supported by only two hinge points when open. When the door 110 is in the closed position, the latch 140 provides a fifth point of contact for the door 110. The multiple points of contact between the door 110 and the compartment 150 decrease the likelihood of failure of door mechanism 100 due to repeated movements between the opened and closed positions.

Figure 2:
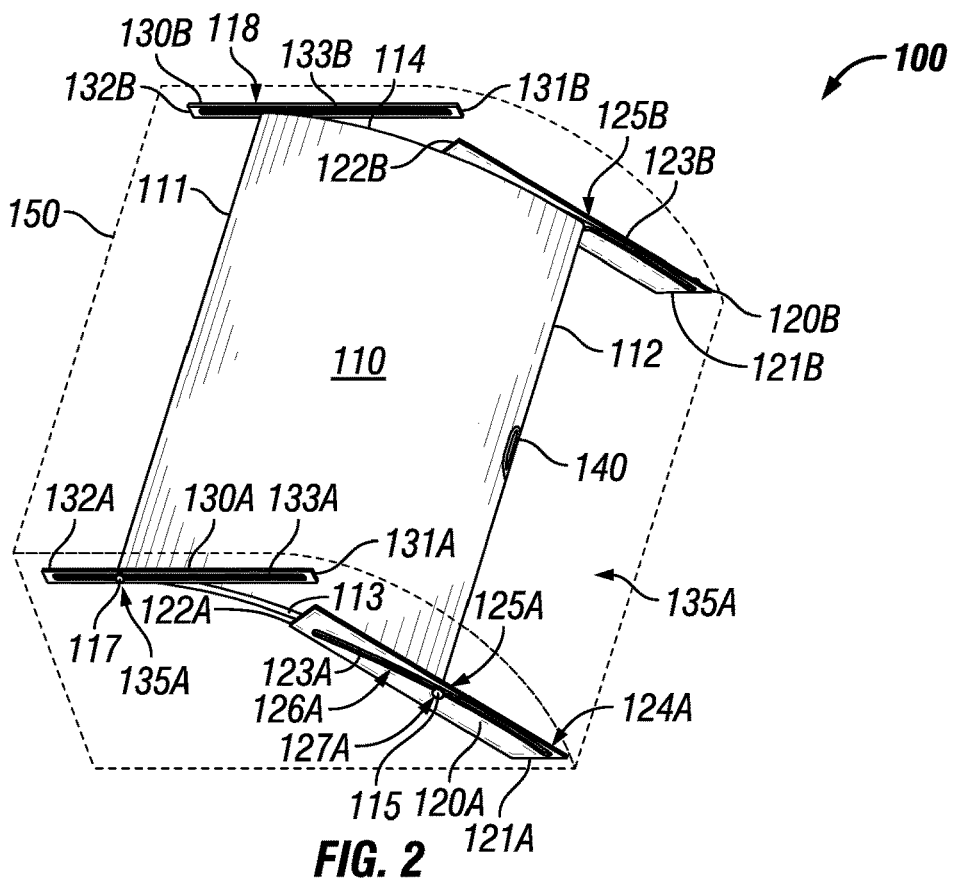
FIG. 2 is a schematic of one example of a track base door hinge mechanism with the door in a partially opened position.

FIG. 2 shows the door 110 in a partially opened position. The first lower guide track 123A includes a second position 125A along the first lower guide track 123A. When the door 110 is partially opened, the first lower guide 115 of the door 110 is positioned in the second position 125A along the first lower guide track 123A. The first lower guide track 123A may include a stop 127A along the first lower guide track 123A to selectively retain the first lower guide 115 at the second position 125A. The first lower guide track 123A may be a curved or arcuate path along the first lower track 120A. The curvature of the path of the first lower guide track 123A may better enable the first lower guide 115 to be positioned within various stops and/or locations along the first lower guide track 123A. The curvature of the path of the first lower guide track 123A may better enable the movement of the first lower guide 115 along the first lower guide track 123A in comparison to a guide track that was substantially vertical.

The second lower guide track 123B includes a second position 125B along the first lower guide track 123A. When the door 110 is partially opened, the second lower guide 116 of the door 110 is positioned in the second position 125B along the second lower guide track 123B. The second lower guide track 123B may include a stop 127B along the second lower guide track 123B to selectively retain the second lower guide 116 at the second position 125B. The second lower guide track 123B may be a curved or arcuate path along the second lower track 120B. The curvature of the path of the second lower guide track 123B may better enable the second lower guide 116 to be positioned within various stops and/or locations along the second lower guide track 123B. The curvature of the path of the second lower guide track 123B may better enable the movement of the second lower guide 116 along the second lower guide track 123B in comparison to a guide track that was substantially vertical.

The size, number, shape, and/or configuration of the first lower track 120A, second lower track 120B, first lower track guide 123A, second lower track guide 123B, and/or stops 127A, 127B may be varied depending on the application as would be appreciated by one of ordinary skill in the art having the benefit of this disclosure. For example, the first and second lower track guides 123A, 123B may include more than one stop located along the length of the first and second lower track guides 123A, 123B.

The first upper guide track 133A includes a second position 135A along the first upper guide track 133A. When the door 110 is partially opened, the first upper guide 117 of the door 110 is positioned in the second position 135A along the first upper guide track 133A. The first upper guide track 133A may be configured to be in a substantially straight line along the first upper track 130A. The first upper guide track 133A may oriented to be substantially parallel to a bottom portion 151 of the compartment 150 as shown in FIG. 2. The second upper guide track 133B includes a second position along the first upper guide track 133A that corresponds to the second position 135A along the first upper guide track 133A. When the door 110 is partially opened, the second upper guide 118 of the door 110 is positioned in the second position along the second upper guide track 133B. The second upper guide track 133B may be configured to be in a substantially straight line along the second upper track 130B. The second upper guide track 133B may oriented to be substantially parallel to a bottom portion 151 of the compartment 150 as shown in FIG. 2.

Figure 3:
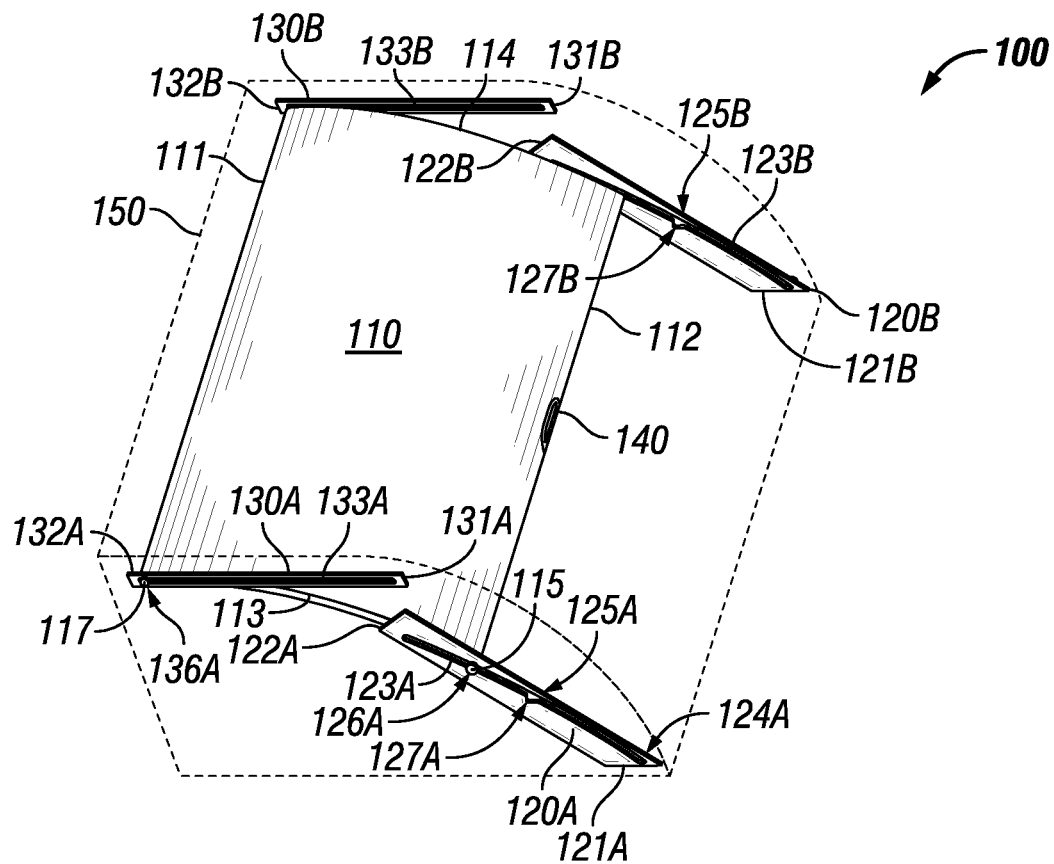
FIG. 3 is a schematic of one example of a track base door hinge mechanism with the door in an opened position.

FIG. 3 shows the door 110 in an open position permitting access to the interior 152 of the compartment 150. The first lower guide track 123A includes a third position 126A along the first lower guide track 123A. When the door 110 is in the open position, the first lower guide 115 of the door 110 is positioned in the third position 126A along the first lower guide track 123A. The first lower guide track 123A may include a stop (not shown) along the first lower guide track 123A to selectively retain the first lower guide 115 at the third position 126A along the first lower guide track 123A. The second lower guide track 123B includes a third position along the second lower guide track 123B that corresponds to the third position 126A of the first lower guide track 123A. When the door 110 is in the open position, the second lower guide 116 of the door 110 is positioned in the third position along the second lower guide track 123B. The second lower guide track 123B may include a stop (not shown) along the second lower guide track 123B to selectively retain the second lower guide 116 at the third position along the second lower guide track 123B. The location of the first, second, and third positions along the first and second lower track guides 123A, 123B are shown for illustrative purposes and may be varied depending on location. For example, the third positions along the first and second lower track guides 123A, 123B may be located at or adjacent to an end of each the first and second lower track guides 123A, 123B, respectively.

The first upper guide track 133A includes a third position 136A along the first upper guide track 133A. When the door 110 is in the open position, the first upper guide 117 of the door 110 is positioned in the third position 136A along the first upper guide track 133A. The first upper guide track 133A may include a stop (not shown) along the first upper guide track 133A to selectively retain the first upper guide 117 at the third position 136A along the first upper guide track 133A. The second upper guide track 133B includes a third position along the second upper guide track 133B that corresponds to the third position 136A of the first upper guide track 133A. When the door 110 is in the open position, the second upper guide 118 of the door 110 is positioned in the third position along the second upper guide track 133B. The second upper guide track 133B may include a stop (not shown) along the second upper guide track 133B to selectively retain the second upper guide 118 at the third position along the second upper guide track 133B. The location of the first, second, and third positions along the first and second upper track guides 133A, 133B are shown for illustrative purposes and may be varied depending on location as would be appreciated by one of ordinary skill in the art having the benefit of this disclosure.

FIG. 3 shows that the door 110 moves into the interior 152 of the compartment 150 when it is moved to the open position. The location of the upper and lower tracks 120A, 120B, 130A, 130B within the compartment 150 enable the door 110 to move into the compartment 150 as it is moved from the closed position to the opened position. The door 110 does not extend into the passenger compartment of the aircraft and thus, does not inhibit movement within the passenger compartment. The door mechanism 100 may enable for efficient loading of luggage into the compartment 150 as passengers enter the aircraft.

As shown in FIG. 1, the first and second lower guides 115, 116 are located adjacent first ends 121A, 121B of the first and second lower tracks 120A, 120B. The first and second lower guides 115, 116 move along the first and second lower track guides 123A, 123B as the door 110 is moved from the closed position to the open position. When the door 110 is positioned at an open position, the lower guides 115, 116 are positioned at third positions 126A, 126B along the first and second lower track guides 123A, 123B. The third positions 126A, 126B may be positioned adjacent second ends 122A, 122B of the first and second lower tracks 120A, 120B. When the door 110 is moved from the open position to the closed position, the first and second lower guides 115, 116 move along the first and second lower track guides 123A, 123B. The first and second lower guides 115, 116 move away from the second ends 122A, 122B of the first and second lower tracks 120A, 120B towards the first ends 121A, 121B of the first and second lower tracks 120A, 120B. The first and second lower track guides 123A, 123B may be formed to be a substantially straight line along the first and second lower tracks 120A, 120B. The first and second lower track guides 123A, 123B may be configured at an angle between 45 degrees and 85 degrees relative to a horizontal bottom portion 151 of the compartment 150.

Figure 4:
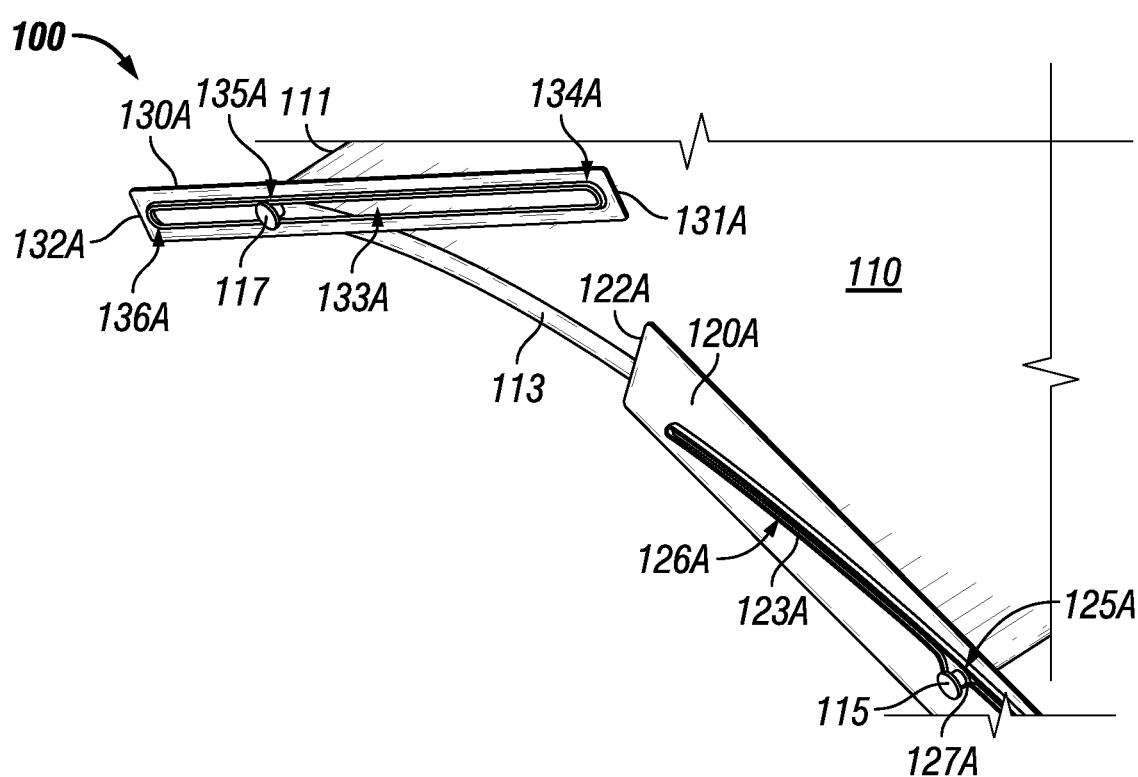
FIG. 4 is a close-up schematic of a portion one example of a track base door hinge mechanism with the door in a partially opened position.

FIG. 4 is a close-up view of the door mechanism 100 showing the door 110 in a partially opened position. FIG. 4 does not show the compartment 150 for clarity purposes. The first lower guide 115 of the door 110 is positioned in a stop 127A that is located at the second position 125A along the first lower guide track 123A. The stop 127A is configured to selectively retain the door 110 in a partially opened position. A user can apply force to lift the first lower guide 115 out of the stop 127A and continue to travel along the first lower guide track 123A. The second lower guide track 123B may include an identical stop positioned at the second position along the second lower guide track 123B as would be appreciated by one of ordinary skill in the art having the benefit of this disclosure. When the door 110 is in the partially opened position, the first upper guide 117 of the door 110 is positioned at a second position 135A along the first upper guide track 133A.

Figure 5:
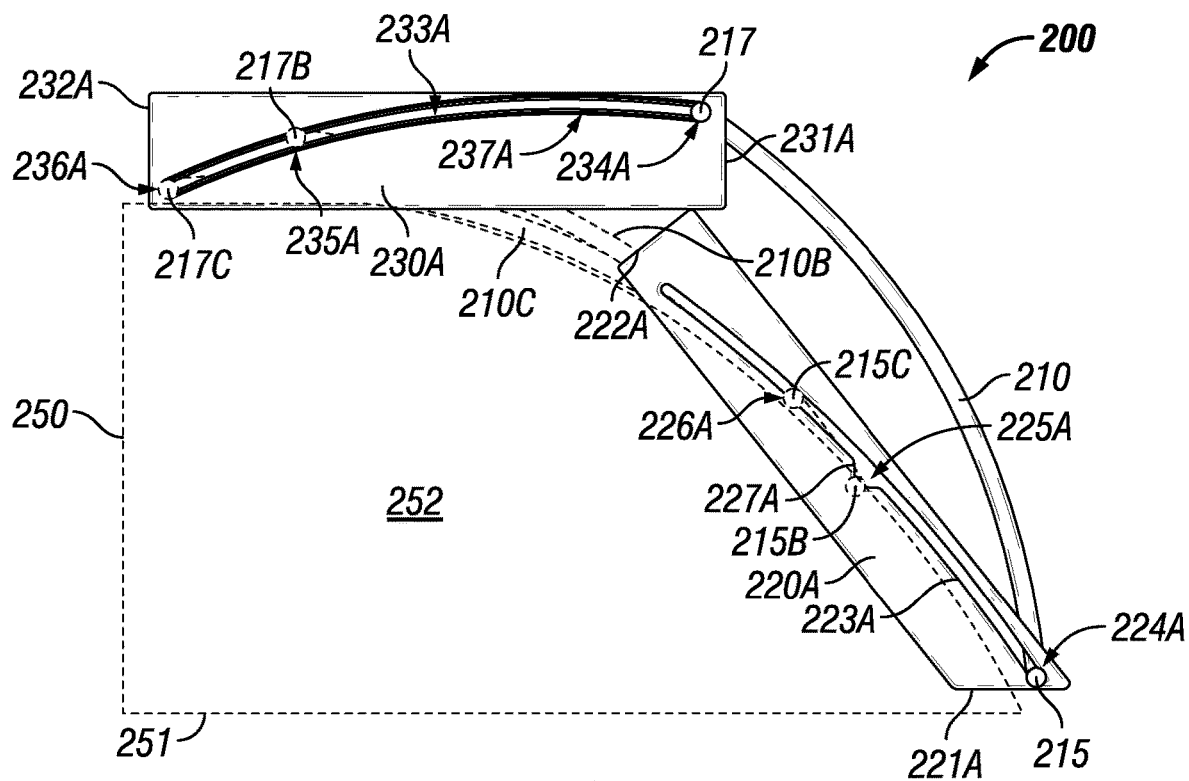
FIG. 5 is a schematic of one example of a track base door hinge mechanism.

FIG. 5 shows a sideview schematic of one example of a door mechanism 200 for a compartment, such as a stowbin 250, in a passenger compartment of an aircraft. The stowbin 250 includes a bottom portion 251 and an interior 252 and is shown in dash for clarity purposes. The door mechanism 200 includes a door 210, which is shown in the closed position. The door 210 in the closed position prevents access to the interior 252 of the stowbin 250. FIG. 5 also shows the door 210B (shown in dash) in a partially opened position, and the door 210C (shown in dash) in an opened position. The door 210 includes a first lower guide 215, a second lower guide (now shown), a first upper guide 217, and a second upper guide (not shown).

The door mechanism 200 includes a first lower track 220A, a second lower track (not shown), a first upper track 230A, and a second upper track (not shown). In one example, the first lower track 220A and the second lower track may be mounted on a sidewall of the stowbin 250. The first upper track 230A and the second upper track may be mounted exterior of the compartment. For example, the first and second upper tracks may be positioned above the stowbin 250 to enable the door 210 to move above or exterior to the stowbin 250 as it moves from the closed position to the open position. As discussed herein, the second lower track may be identical to the first lower track 220A and the second upper track may be identical to the first upper track 230A.

The first lower track 220A includes a first end 221A, a second end 222A, and a first lower guide track 223A that extends substantially from the first end 221A to the second end 222A of the first lower track 220A. The first lower guide track 223A is configured to permit the first lower guide 215 of the door 210 to travel along the first lower guide track 223A as the door 210 moves between open and closed positions. The first lower guide track 223A includes a first position 224A along the first lower guide track 223A. When the door 210 is closed, the first lower guide 215 of the door 210 is positioned in the first position 124A along the first lower guide track 223A. As discussed herein, the second lower track (not shown) may be substantially identical to the first lower track 220A.

The first upper track 230A includes a first end 231A, a second end 232A, and a first upper guide track 233A that extends substantially from the first end 231A to the second end 232A of the first upper track 230A. The first upper guide track 233A is configured to permit the first upper guide 217 of the door 210 to travel along the first upper guide track 233A as the door 210 moves between open and closed positions. The first upper guide track 233A includes a first position 234A along the first upper guide track 233A. When the door 210 is closed, the first upper guide 217 of the door 210 is positioned in the first position 234A along the first upper guide track 233A. As discussed herein, the second upper track (not shown) may be substantially identical to the first upper track 230A.

The first lower track guide 223A, second lower track guide (not shown), first upper track guide 233A, and the second upper track guides are configured to engage the guides first lower guide 215, second lower guide (not shown), first upper guide 217, and second upper guide (not show) of the door 210 as the door 210 moves between the closed and opened positions, which provide at least four points of support at all times.

Door 210B is shown in the partially opened position. The first lower guide track 223A includes a second position 225A along the first lower guide track 223A at which the first lower guide 215B (shown in dash) is located when the door 210B is partially opened. The first lower guide track 223A may include a stop 227A along the first lower guide track 223A to selectively retain the first lower guide 215 at the second position 225A. The first lower guide track 123A may be a curved or arcuate path along the first lower track 220A. The curvature of the path of the first lower guide track 223A may better enable the first lower guide 215 to be positioned within various stops and/or locations along the first lower guide track 223A. The curvature of the path of the first lower guide track 223A may better enable the movement of the first lower guide 215 along the first lower guide track 223A in comparison to a guide track that was substantially vertical. As discussed herein, the second lower track (not shown) may be substantially identical to the first lower track 220A.

The first upper guide track 233A includes a second position 235A along the first upper guide track 233A at which the first upper guide 217B (shown in dash) is located when the door 210B is partially opened. The first upper guide track 233A may be configured to be substantially curved or arcuate along the first upper track 230A. The curved first upper guide track 233A and corresponding second upper guide track (not shown) provide that the first upper guide 217 and second upper guide (not show) of the door 210 may require less force to counter gravity as the first upper guide 217 and second upper guide move along portions of the first upper guide track 233A and corresponding second supper guide track.

For example, the first upper guide track 233A may include an inflection point 237A along the first upper guide track 233A. The first upper guide track 233A may have an upward slope for the portion of the first upper guide track 233A that is forward of the inflection point 237A and a downward slope for the portion of the first upper guide track 233A that is rearward of the inflection point 237A. The upward slope of the forward portion of the first upper guide track 233A may help to retain the door 210 in the closed position until a user has moved the door 210 past the inflection point 237A. The downward slope of the rearward portion of the first upper guide track 233A may reduce the amount of force needs to move the door 210 to the open position once past the inflection point 237A. For example, the downward slope of the rearward portion of the first upper guide track 233A may require less force by the user moving the door to counter gravity.

The downward slope may help to retain the door 210 in the open position. As discussed herein, the second upper track (not shown) may be substantially identical to the first upper track 230A. The downward slope may help to prevent the door 210 from inadvertently moving to the closed position from the open position. The downward slope of the first upper guide track 233A requires the first upper guide 217 to move in an upward path when moving from the open position to the closed position. The upward movement may require more force than the force required to move in the opposite direction along the same portion of the first upper guide track 233A. As the first upper guide 217 moves along the first upper guide track 233A from the open position to the closed position, the force required to overcome gravity may decrease once the first upper guide 217 passes the inflection point 237A along the first upper guide track 233A.

The curved the first upper guide track 233A may be configured to help to retain the door in the open positioned when opened and the door in the closed position when closed. The curved first upper guide track 223A requires the first upper guide 217 to first move up a slope when moving to the open position from the closed position. Likewise, the curved first upper guide track 223A requires the first upper guide 217 to first move up a slop when moving to the closed position from the open position. The movement up a slope requires additional force with respect to the downward slope portions of the first upper guide track 223A depending on the direction of movement of the first upper guide 217. This configuration helps to prevent the inadvertent or premature movement of the door 210. As discussed herein, the door mechanism 200 for a compartment may include a second upper guide track that is identical to the first upper guide track 223A.

The first lower guide track 223A includes a third position 226A along the first lower guide track 223A at which the first lower guide 215C (shown in dash) is located when the door 210B is in the open position. When the door 210C is in the open position, the door 210C is position exterior of the stowbin 250. Specifically, the door 210C may be positioned above the stowbin 250. As discussed herein, the second lower track (not shown) may be substantially identical to the first lower track 220A.

The first upper guide track 233A includes a third position 236A along the first upper guide track 233A at which the first upper guide 217C (shown in dash) is located when the door 210B is in the open position. As discussed herein, the second upper track (not shown) may be substantially identical to the first upper track 230A.

Figure 6:
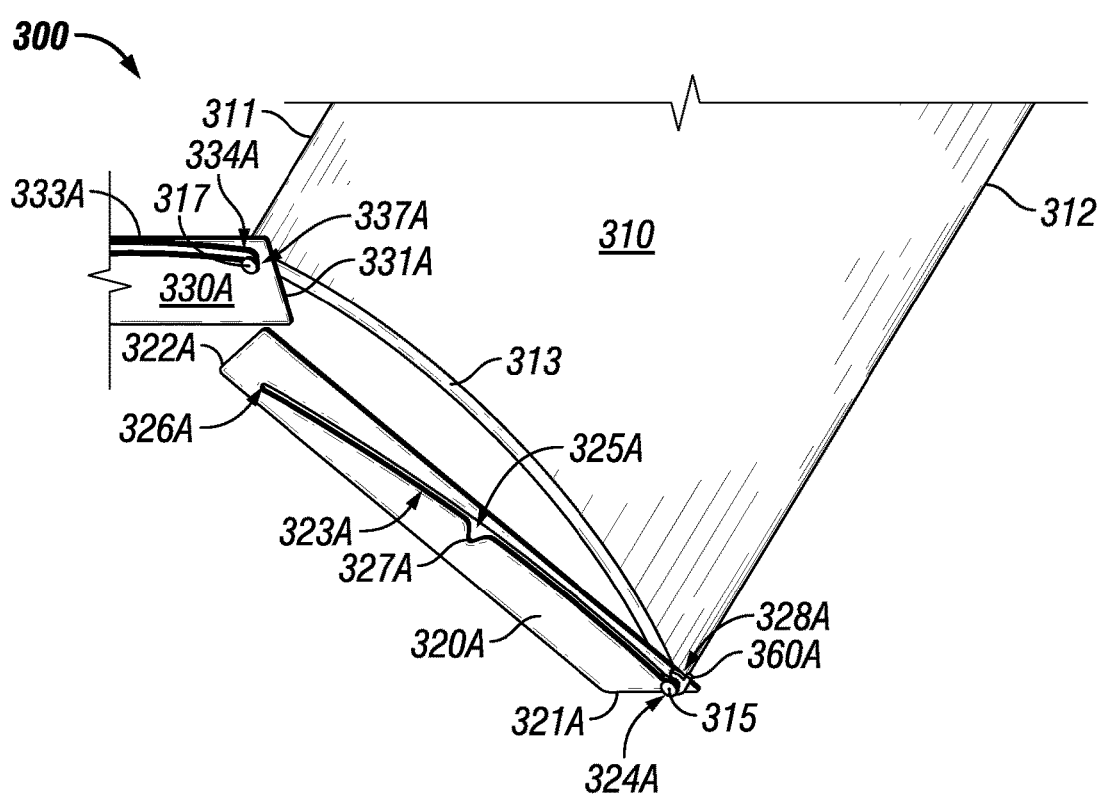
FIG. 6 is a schematic of one example of a track base door hinge mechanism.

FIG. 6 shows a schematic of a portion of one example of a door mechanism 300 for a compartment, such as a stowbin, in a passenger compartment of an aircraft. The stowbin is not shown in FIG. 6 for clarity purposes. The door mechanism 300 includes a door 210 having an upper edge, 311, lower edge 312 opposite the upper edge 311, a left edge 313, and a right edge (not shown) opposite the left edge 313. The door 310 is shown in the closed position in FIG. 6. The door 310 includes a first lower guide 315, a second lower guide (now shown), a first upper guide 317, and a second upper guide (not shown).

The door mechanism 300 includes a first lower track 320A, a second lower track (not shown), a first upper track 330A, and a second upper track (not shown). The second lower track may be identical to the first lower track 320A. Likewise, the second upper track may be identical to the first upper track 330A. The first lower track 320A includes a first end 321A, a second end 322A, and a first lower guide track 323A that extends substantially from the first end 321A to the second end 322A of the first lower track 320A. As discussed herein, the first lower guide track 323A is configured to permit the first lower guide 315 of the door 310 to travel along the first lower guide track 323A as the door 310 moves between open and closed positions as discussed herein.

The first lower guide track 323A includes a first position 324A when the door 310 is closed, a second position 325A when the door 310 is partially opened, and a third position 326A when the door 310 is in the opened position. The first lower guide track 323A may include one or more stops along the first lower guide track 323A. For example, the first lower guide track 323A may include a stop 327A at the second position 325A along the first lower track guide 323A. The number, location, and/or configuration of the positions and/or stops along the first lower guide track 323A may be varied depending on the application as would be appreciated by one of ordinary skill in the art having the benefit of this disclosure. The second lower track may be substantially identical to the first lower track 320A as discussed herein.

The first upper track 330A includes a first end 331A, a second end (not shown) opposite of the first end 331A, and a first upper guide track 333A that extends substantially from the first end 331A to the second end of the first upper track 330A. The first upper guide track 333A is configured to permit the first upper guide 317 of the door 310 to travel along the first upper guide track 333A as the door 310 moves between open and closed positions as discussed herein. The first upper guide track 333A includes a first position 334A along the first upper guide track 333A when the door 310 is closed, a second position (not shown) when the door 310 is partially opened, and a third position (not shown) when the door 310 is in the opened position. The first upper guide tracks 333A may include one or more stops along the first upper guide tracks 333A as would be recognized by one of ordinary skill in the art having the benefit of this disclosure. The number, location, and/or configuration of the positions and/or stops along the first upper guide track 333A may be varied depending on the application as would be appreciated by one of ordinary skill in the art having the benefit of this disclosure. The second upper track may be substantially identical to the first upper track 330A as discussed herein.

Figure 7:
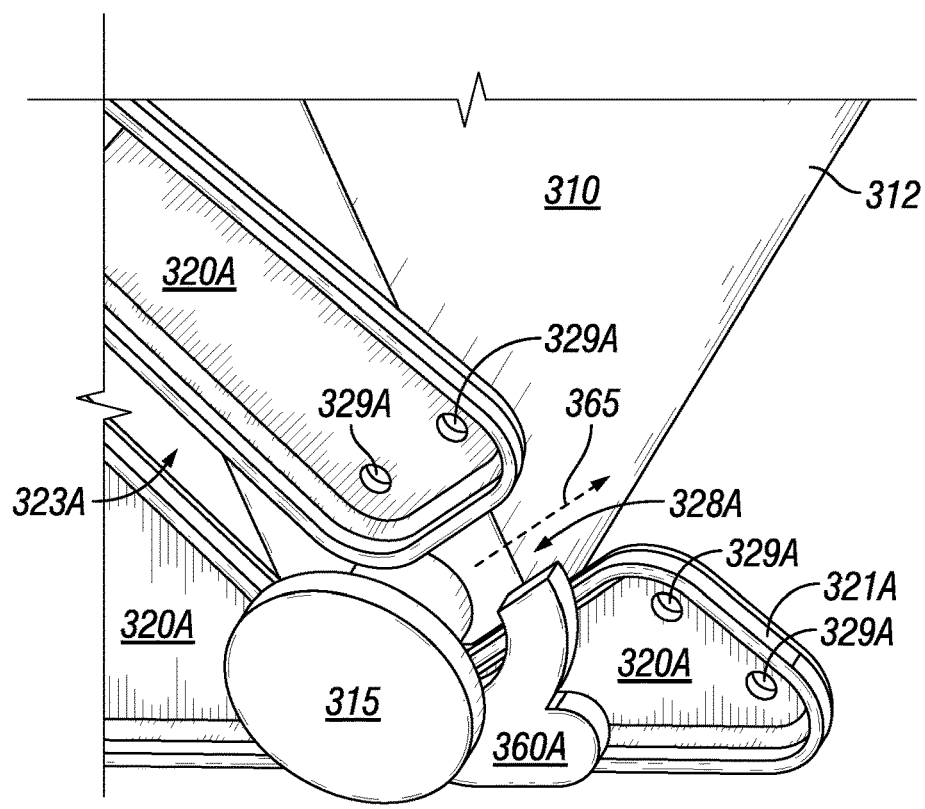
FIG. 7 is a close-up schematic of a portion one example of a track base door hinge mechanism.
Figure 8:
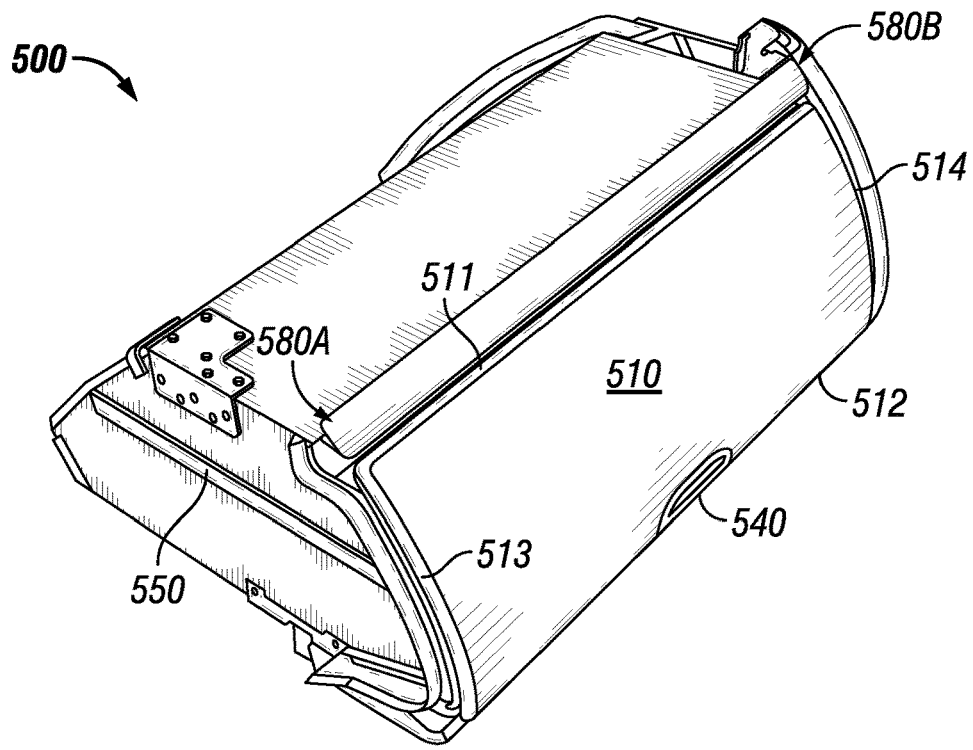
FIG. 8 is a schematic showing a previous door for a storage bin of an aircraft.

Apertures 329A in the first lower track 320A enable to first lower track 320A to be connected to a structure within an aircraft such as, but not limited to, the sidewalls of a compartment or stowbin. The first lower guide track 323A may include a gap 328A (best shown in FIG. 7) located at or adjacent to the first position 324A along the first lower guide track 323A. The gap 328A is configured to enable the door 310 to be selectively uncoupled from the first lower track 320A. FIG. 7 is a close-up view of the first lower track 320A of the door mechanism 300. The gap 328A along the first lower guide track 323A permits the first lower guide 315 of the door 310 to move through the gap 328A, as indicated by arrow 365, to selectively uncouple the door 310 from the first lower track 320A. Likewise, the second lower track would include a similar gap permitting the second lower guide to move through the gap to selectively uncouple the door 310 from the second lower track.

The door 310 may pivot about the first upper guide 317 and the second upper guide (not shown) to permit the door 310 to swing up and away from the storage compartment. The first upper guide track 333A of the first upper track 330A may be configured to enable the door 310 to pivot. For example, the first position 334A along the first upper guide track 333A may include a stop, or recess, 337A that enables to the door 310 to pivot about the first upper guide 317. Likewise, the second upper guide track of the second upper track would include a similar stop, or recess, to enables to the door 310 to pivot about the second upper guide.

The door mechanism 300 may include a latch 360A used to selectively close the gap 328A in the first lower track guide 323A to prevent the undesired movement of the first lower guide 315 through the gap 328A. FIG. 6 shows the latch 360A blocking the gap 328A to prevent the movement of the guide 315 through the gap 328A. FIG. 7 shows the latch 360A moved out of the away of the gap 328A permitting the first lower guide 315 to move through the gap 328A to selectively uncoupled the door 310 from the first lower track 320A. The second lower track may include a similar latch that may selectively block the gap in the second lower track guide of the second lower track. Alternatively, the door mechanism 300 may include a single latch 360A that prevents the door 310 from being uncoupled from one of the first lower track 320A.

Figure 9:
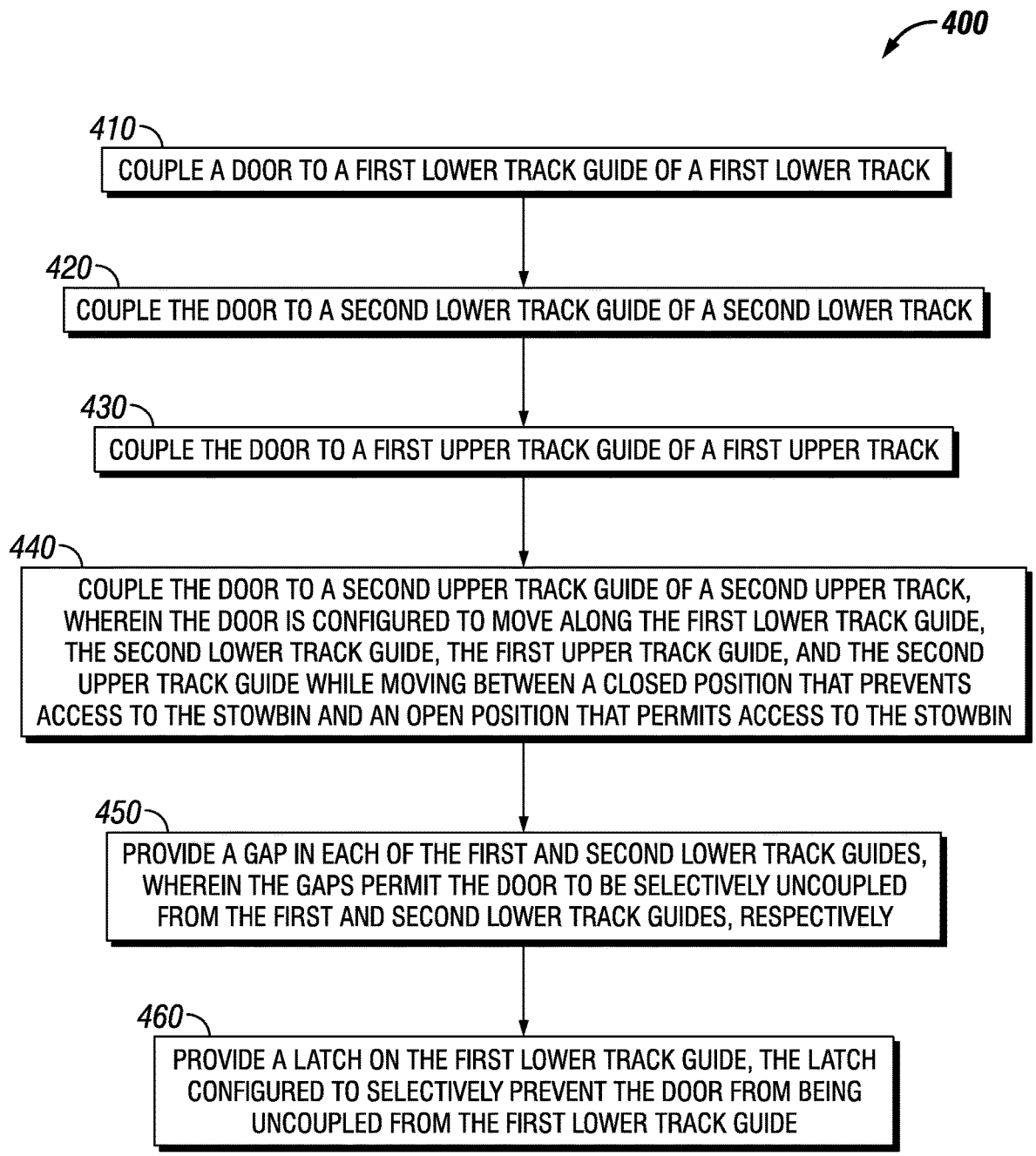
FIG. 9 is a flow chart of one example of a method of providing a door mechanism for a stowbin of an aircraft.

FIG. 9 is a flowchart for a method 400 of providing a door mechanism for a stowbin of an aircraft. The method 400 includes coupling a door to a first lower track guide of a first lower track, at 410. The method includes coupling the door to a second lower track guide of a second lower track, at 420, and coupling the door to a first upper track guide of a first upper track, at 430. At 440, the method 400 includes coupled the door to a second upper track guide of a second upper track, wherein the door is configured to move along the first lower track guide, the second lower track guide, the first upper track guide, and the second upper track guide while moving between a closed position that prevents access to the stowbin and an open position that permits access to the stowbin.

The method 400 may include providing a gap in each of the first and second lower track guide, wherein the gaps permit the door to be selectively uncoupled from the first and second lower track guides, respectively, at 450. At 460, the method 400 may include providing a latch on the first lower track guide, the latch being configured to selectively prevent the door from being uncoupled from the first lower track guide. A second latch could be provided on the second lower track guide to selectively prevent the door from being uncoupled from the second lower track guide as discussed herein.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A door mechanism for a compartment on an aircraft comprising:
    a door having a bottom edge, a top edge opposite the bottom edge, a left edge, and a right edge opposite the left edge, the door having a first lower guide on the left edge, a second lower guide on the right edge, a first upper guide on the left edge, and a second upper guide on the right edge;
    a first lower track having a first lower guide track, wherein the first lower guide is configured to travel along the first lower guide track and wherein the first lower track has a first length;
    a second lower track having a second lower guide track, wherein the second lower guide is configured to travel along the second lower guide track and wherein the second lower track has a second length;
    a first upper track having a first upper guide track, wherein the first upper guide is configured to travel along the first upper guide track; and
    a second upper track having a second upper guide track, wherein the second upper guide is configured to travel along the second upper guide track;
    the door having an open position that enables access to an interior of the compartment on the aircraft and a closed position that prevents access to the interior of the compartment on the aircraft, wherein the entire door is positioned within the compartment when in the open position; and
    the first lower track having a first gap that opens to the first lower guide track, the first gap being substantially transverse to the first length of the first lower track and the second lower track having a second gap that opens to the second lower guide track, the second gap being substantially transverse to the second length of the second lower track and wherein the first lower guide and the second lower guide are configured to move out of the first lower guide track the second lower guide track, respectively, through the first and second gaps.

2. The door mechanism of claim 1, comprising a latch along the bottom edge of the door, wherein the latch is configured to selectively secure the door in a closed position.

3. The door mechanism of claim 1, wherein the first upper guide track and the second upper guide track are each substantially straight lines along the first upper track and the second upper track, respectively, and wherein the first lower guide track and the second lower guide track are each curved along the first lower track and second lower track, respectively.

4. The door mechanism of claim 3, wherein first and second upper guide tracks are substantially parallel to a bottom portion of the compartment.

5. The door mechanism of claim 4, wherein each of the first and second lower guide tracks each includes at least one stop positioned along the first and second lower guide tracks.

6. The door mechanism of claim 5, wherein the door is in a partially opened position when the first and second lower guides are positioned, respectively, within the at least one stop positioned along the first and second lower guide tracks.

7. The door mechanism of claim 1, wherein the first upper guide track and the second upper guide track are each curved along the first upper track and second upper track, respectively, and wherein the first lower guide track and the second lower guide track are each curved along the first lower track and second lower track, respectively.

8. The door mechanism of claim 7, wherein each of the first and second upper guide tracks includes an inflection point, wherein a portion of the first and second upper guide tracks forward of the inflection point has curved upward slope and wherein a portion of the first and second upper tracks behind the inflection point has a curved downward slope.

9. The door mechanism of claim 1, wherein the door is configured to pivot about the first and second upper guides to enable the bottom edge of the door to move away from the compartment.

10. The door mechanism of claim 9, comprising a first latch configured to selectively prevent movement of the first lower guide through the first gap.

11. The door mechanism of claim 5, wherein the at least one stop positioned along the first lower guide track is positioned between a first end of the first lower guide track and a second end of the first lower guide track and wherein the at least stop positioned along the second lower guide track is positioned above the first end of the first lower guide track and is positioned below the second end of the first lower guide track.

12. The door mechanism of claim 11, wherein the at least one stop positioned along the second lower guide track is positioned between a first end of the second lower guide track and a second end of the second lower guide track and wherein the at least stop along the second lower guide track is positioned above the first end of the second lower guide track and is positioned below the second end of the second lower guide track.

13. A door mechanism comprising:
a door having a bottom edge, a top edge opposite the bottom edge, a left edge, and a right edge opposite the left edge, the door having a first lower guide on the left edge, a second lower guide on the right edge, a first upper guide on the left edge, and a second upper guide on the right edge;
a first lower track having a first lower guide track, wherein the first lower guide is configured to travel along the first lower guide track;
a second lower track having a second lower guide track, wherein the second lower guide is configured to travel along the second lower guide track;
a first upper track having a first upper guide track, wherein the first upper guide is configured to travel along the first upper guide track;
a second upper track having a second upper guide track, wherein the second upper guide is configured to travel along the second upper guide track; and
the door having an open position that enables access to an interior of the compartment on an aircraft and a closed position that prevents access to the interior of the compartment on the aircraft, wherein the entire door is positioned outside of the compartment when in the open position.

14. The door mechanism of claim 13, wherein each of the first and second lower guide tracks each includes at least one stop positioned along the first and second lower guide tracks.

15. The door mechanism of claim 13, the first lower track having a first gap that opens to the first lower guide track and the second lower track having a second gap that opens to the second lower guide track, wherein the first lower guide and the second lower guide are configured to move out of the first lower guide track the second lower guide track, respectively, through the first and second gaps.

16. The door mechanism of claim 15, wherein the door is configured to pivot about the first and second upper guides to enable the bottom edge of the door to move away from the compartment.

17. The door mechanism of claim 16, comprising a first latch configured to selectively prevent movement of the first lower guide through the first gap.

18. The door mechanism of claim 13, wherein the compartment on the aircraft is within a passenger compartment of the aircraft.

19. A door mechanism and stowbin system for an aircraft comprising:
a stowbin having an interior volume;
a curved door positioned adjacent to the stowbin, the door being movable between a closed position that prevents access to the interior volume of the stowbin and an open position that permits access to the interior volume of the stowbin, the curved door having a bottom edge, a top edge opposite the bottom edge, a left edge, and a right edge opposite of the left edge, the curved door having a first lower guide on the left edge, a second lower guide on the right edge, a first upper guide on the left edge, and a second upper guide on the right edge;
a first lower track having a first lower guide track;
a second lower track having a second lower guide track;
a first upper track having a first upper guide track;
a second upper track having a second upper guide track, wherein the door travels along the first lower guide track, second lower guide track, the first upper guide track, and the second upper guide track as the door moves between the open position and the closed position;
wherein the door moves exterior of the stowbin as the door moves from the closed position to the open position; and
wherein the entire door is positioned outside of the interior volume when in the open position.

20. The door mechanism and stowbin system of claim 19, wherein the first and second lower tracks are configured to enable a portion of the door to move away from the stowbin and wherein the first and second upper tracks are configured to enable a portion of the door to pivot about the first and second upper tracks.

* * * * *